F. L. THOMPSON.
ANIMAL POKE.
APPLICATION FILED JULY 6, 1918.
1,295,815.
Patented Feb. 25, 1919.
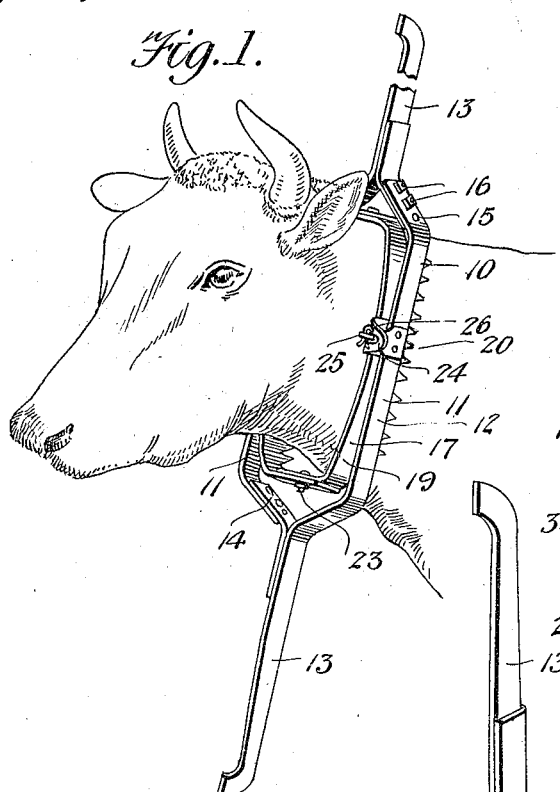
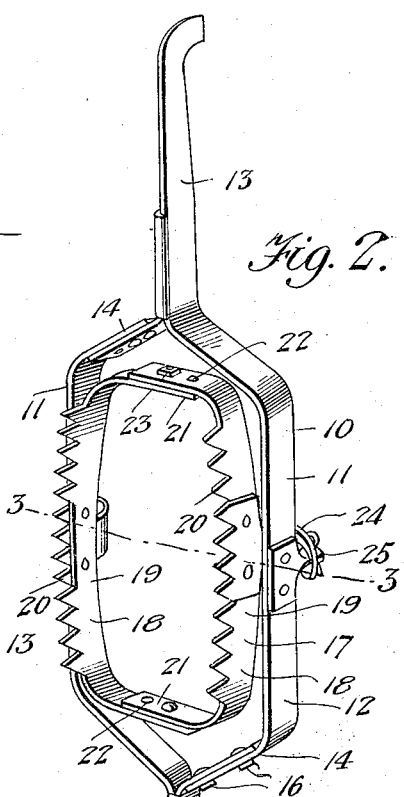
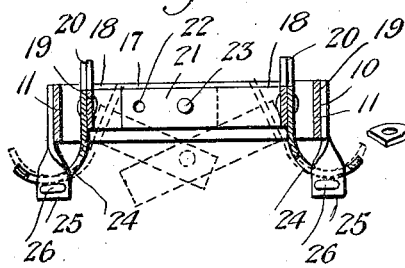
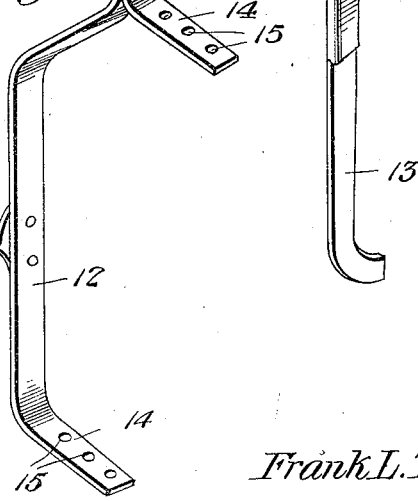
Inventor
Frank L. Thompson
Witnesses
By Victor J. Evans
Attorney

UNITED STATES PATENT OFFICE.

FRANK L. THOMPSON, OF OKLAHOMA, OKLAHOMA.

ANIMAL-POKE.

1,295,815.

Specification of Letters Patent. Patented Feb. 25, 1919.

Application filed July 6, 1918. Serial No. 243,519.

*To all whom it may concern:*

Be it known that I, FRANK L. THOMPSON, a citizen of the United States, residing at Oklahoma, in the county of Oklahoma and State of Oklahoma, have invented new and useful Improvements in Animal-Pokes, of which the following is a specification.

This invention relates to animal pokes; and has for its object to provide a device adapted to be worn by an animal to prevent his escape through a fence or other disclosure.

The invention resides particularly in the novel manner of forming a yoke of the device so that contact of the poke bar with an obstruction will cause the pointed teeth to be deflected inwardly in contact with the neck of the animal.

For this purpose the invention includes an auxiliary yoke embodying two sections provided with teeth or serrations and adjustable and pivotally secured together, the said auxiliary yoke being pivotally mounted within the main yoke which latter carries the poke bars, so that contact of the bars with an obstruction will cause the teeth or serrations to be deflected inwardly toward the neck of the animal.

Other objects and advantages of the invention will appear when the following description is read in connection with the accompanying drawings, in which:—

Figure 1 is a view showing the invention applied to the neck of a cow;

Fig. 2 is a perspective view of the invention *per se;*

Fig. 3 is a sectional view on the line 3—3 of Fig. 2 and illustrating the normal position of the yoke by full lines and the operation of the auxiliary yoke by dotted lines; and Fig. 4 is a detail perspective view of one of the sections of the main yoke.

Referring to the drawings in detail, the invention includes a main yoke 10, which is formed of two sections 11, each of said sections including a side bar 12, a poke bar 13 and laterally extending parallel projections 14. The projections 14 are provided with a series of apertures 15, by means of which the main yoke sections are adjustably secured together through the medium of bolts or other fastening devices 16.

The invention also includes an auxiliary yoke 17, which is also formed of two sections 18. These sections are similar in construction and including side bars 19 provided along one edge with teeth or serrations 20, which are adapted to contact with the neck of the animal as is usual in devices of this character. The side bars 19 are formed with laterally extending projections 21, which are formed with a plurality of apertures 22 for the passage of bolts or analogous fastening device 23, and by means of which the sections 18 may be adjustably secured together. The auxiliary yoke is pivotally secured within the main yoke and for this purpose each section of the auxiliary yoke carries lateral projecting perforated ears 24, which are adapted to receive lugs 25, the latter carrying fastening devices 26 for the purpose of holding the lugs in position within the ears. The perforations of the ears 24 are such as to permit of a pivotal movement of the sections 18 of the auxiliary yoke.

When the poke is in position and the bars 13 contact with an obstruction, the rearward movement of the device along the neck of the animal will cause each of the sections 18 to have a pivotal movement both with respect to one another and to the main yoke, deflecting the teeth or serrations 21 inwardly against the neck of the animal, the relative positions of these sections being shown in Fig. 3.

The invention is susceptible of various changes in its form and proportion and minor details of construction and the right is reserved to make such changes.

Having described the invention, what is claimed is:—

1. An animal poke embodying a main yoke, poke bars carried thereby and a toothed auxiliary yoke mounted within said main yoke and capable of movement to deflect the teeth inwardly toward the neck of the animal.

2. An animal poke embodying a main yoke, poke bars carried thereby, an auxiliary yoke mounted within the main yoke and capable of relative movement thereto and means carried by the auxiliary yoke for pricking the neck of the animal.

3. An animal poke embodying a main yoke, poke bars carried thereby and a toothed auxiliary yoke pivotally mounted within the main yoke and capable of movement to deflect the teeth inwardly toward the neck of the animal.

4. An animal poke embodying a main yoke, poke bars carried thereby and a toothed sectional yoke mounted within the main yoke and capable of movement to deflect the teeth inwardly toward the neck of the animal.

5. An animal poke embodying a main yoke, comprising two sections, each of said sections including a side bar, a poke bar and side bars for adjustably securing the sections together and a toothed auxiliary yoke mounted within said main yoke and capable of movement to deflect the teeth inwardly toward the neck of the animal.

6. An animal poke embodying a main yoke, poke bars carried thereby, an auxiliary yoke pivotally secured within the main yoke, said yoke including two sections, each of said sections comprising toothed side bars and lateral extensions and means for adjustably and pivotally securing sections together in a manner to deflect the teeth inwardly through contact of the poke bars with an obstruction.

In testimony whereof I affix my signature.

FRANK L. THOMPSON.

Copies of this patent may be obtained for five cents each, by addressing the "Commissioner of Patents, Washington, D. C."